United States Patent
Choi et al.

(10) Patent No.: US 11,059,521 B2
(45) Date of Patent: Jul. 13, 2021

(54) COWL CROSS BAR FOR VEHICLE

(71) Applicants: HYUNDAI MOTOR COMPANY, Seoul (KR); KIA MOTORS CORPORATION, Seoul (KR)

(72) Inventors: Sung Sik Choi, Suwon-si (KR); Byung Seok Kong, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 104 days.

(21) Appl. No.: 16/592,274

(22) Filed: Oct. 3, 2019

(65) Prior Publication Data

US 2021/0001925 A1 Jan. 7, 2021

(30) Foreign Application Priority Data

Jul. 5, 2019 (KR) .................. 10-2019-0081010

(51) Int. Cl.
| | | |
|---|---|---|
| B60R 19/34 | (2006.01) | |
| B62D 25/14 | (2006.01) | |
| B62D 1/02 | (2006.01) | |
| B62D 29/00 | (2006.01) | |
| B62D 27/02 | (2006.01) | |

(52) U.S. Cl.
CPC .............. B62D 25/145 (2013.01); B62D 1/02 (2013.01); B62D 25/142 (2013.01); B62D 27/02 (2013.01); B62D 29/008 (2013.01)

(58) Field of Classification Search
CPC .... B62D 25/145; B62D 27/02; B62D 29/008; B62D 1/184; B60R 21/045; B60R 21/205; B60Y 2410/121
See application file for complete search history.

(56) References Cited

U.S. PATENT DOCUMENTS

| | | | | |
|---|---|---|---|---|
| 5,074,583 A | * | 12/1991 | Fujita | B60R 21/01536 280/730.1 |
| 5,364,159 A | * | 11/1994 | Kelman | B60K 37/00 296/192 |
| 5,387,023 A | * | 2/1995 | Deneau | B60K 37/00 296/187.12 |
| 5,564,769 A | * | 10/1996 | Deneau | B62D 21/15 180/90 |

(Continued)

*Primary Examiner* — Kiran B Patel
(74) *Attorney, Agent, or Firm* — McDonnell Boehnen Hulbert & Berghoff LLP (57) ABSTRACT

A cowl cross bar is provided for a vehicle capable of easily ensuring a space in which a heads-up display device is disposed and a passage through which an air duct extends, and which exhibits improved self-supporting stiffness and sufficient stiffness to support a steering column. The cowl cross bar includes a main bar disposed in a lateral direction from a vehicle body, a pair of first brackets for supporting hardware, which is coupled to the main bar and extends forward therefrom, a second bracket for supporting a steering column, which is coupled to the main bar and extends forward therefrom, the second bracket being disposed between lower ends of the pair of first brackets for supporting hardware, and a third bracket for reinforcement, which is disposed between the pair of first brackets for supporting hardware and the second bracket for supporting the steering column and is connected thereto.

11 Claims, 6 Drawing Sheets

(56) References Cited

U.S. PATENT DOCUMENTS

| | | | | |
|---|---|---|---|---|
| 6,027,088 A * | 2/2000 | Stedman | B62D 1/195 | 248/200 |
| 6,371,551 B1 * | 4/2002 | Hedderly | B60K 37/00 | 180/90 |
| 6,447,041 B1 * | 9/2002 | Vandersluis | B60H 1/0055 | 296/203.02 |
| 6,464,280 B1 * | 10/2002 | Shibata | B60H 1/00535 | 280/728.3 |
| 6,497,432 B2 * | 12/2002 | Scheib | B60H 1/0055 | 280/779 |
| 7,810,874 B2 * | 10/2010 | Vican | B62D 25/147 | 296/193.02 |
| 2001/0024035 A1 * | 9/2001 | Scheib | B60H 1/242 | 280/779 |
| 2002/0105204 A1 * | 8/2002 | Scheidel | B62D 25/145 | 296/70 |
| 2003/0047837 A1 * | 3/2003 | Roberts | B62D 29/001 | 264/238 |
| 2003/0155793 A1 * | 8/2003 | Yoshihara | B62D 25/142 | 296/208 |
| 2004/0036310 A1 * | 2/2004 | Mills | B62D 25/145 | 296/72 |
| 2004/0041432 A1 * | 3/2004 | Baker | B60H 1/0055 | 296/70 |
| 2004/0090088 A1 * | 5/2004 | Reed | B60H 1/0055 | 296/208 |
| 2004/0108744 A1 * | 6/2004 | Scheib | B62D 25/142 | 296/70 |
| 2004/0197528 A1 * | 10/2004 | Roberts | B29D 22/00 | 428/174 |
| 2004/0262954 A1 * | 12/2004 | Scheib | B62D 29/004 | 296/193.02 |
| 2006/0038424 A1 * | 2/2006 | Aoki | B62D 25/145 | 296/70 |
| 2006/0108824 A1 * | 5/2006 | Yamazaki | B60H 1/242 | 296/70 |
| 2007/0210616 A1 * | 9/2007 | Wenzel | B29C 45/006 | 296/187.03 |
| 2008/0048470 A1 * | 2/2008 | Vican | B62D 25/145 | 296/193.02 |
| 2008/0238128 A1 * | 10/2008 | Baudart | B62D 65/14 | 296/70 |
| 2010/0090451 A1 * | 4/2010 | Atsumi | B62D 25/145 | 280/779 |
| 2011/0285174 A1 * | 11/2011 | Malek | B62D 29/001 | 296/193.02 |
| 2012/0274090 A1 * | 11/2012 | Carter | B60H 1/00542 | 296/70 |
| 2013/0057026 A1 * | 3/2013 | Kim | B62D 25/145 | 296/192 |
| 2013/0134736 A1 * | 5/2013 | Kuwabara | B62D 25/081 | 296/72 |
| 2017/0120955 A1 * | 5/2017 | Kim | B62D 25/145 | |
| 2019/0210464 A1 * | 7/2019 | Dormanns | B60H 1/00564 | |
| 2020/0122778 A1 * | 4/2020 | Werneke | B62D 25/145 | |
| 2020/0189661 A1 * | 6/2020 | Kong | B62D 1/19 | |

* cited by examiner

COWL CROSS BAR FOR VEHICLE

CROSS-REFERENCE TO RELATED APPLICATION

This application claims under 35 U.S.C. § 119(a) the benefit of priority to Korean Patent Application No. 10-2019-0081010 filed on Jul. 5, 2019, the entire contents of which are incorporated herein by reference.

BACKGROUND

(a) Technical Field

The present disclosure relates to a cowl cross bar for a vehicle. More particularly, the present disclosure relates to a cowl cross bar for a vehicle which is capable of easily ensuring a space in which a heads-up display device is disposed and a passage through which an air duct extends and of improving the stiffness required to support a steering column.

(b) Background

Typically, a cowl cross bar for a vehicle is disposed in front of a driver's seat and a front passenger's seat and extends in a lateral direction of the vehicle. The cowl cross bar is fixedly mounted on a vehicle body panel (for example, a front pillar inner panel or the like) via a mounting bracket.

Particularly, the cowl cross bar is connected to a steering column connected to a steering wheel and is supported thereby.

The cowl cross bar functions primarily to cancel vibrations, which are transmitted to a steering column from a vibration source such as an engine, in order to prevent a driver from suffering the discomfort of the vibrations. Furthermore, the cowl cross bar functions to hold and support a steering column in order to prevent a driver from being injured by collision energy transmitted to the steering column in the event of a collision, and also to support a crash pad, an air conditioning unit, an electronic component, or the like.

In order to efficiently fulfill the above functions, the cowl cross bar is designed and manufactured so as to have a natural resonant frequency and sufficient stiffness to avoid resonating with vibration frequencies transmitted from the vibration source.

Figure 1:
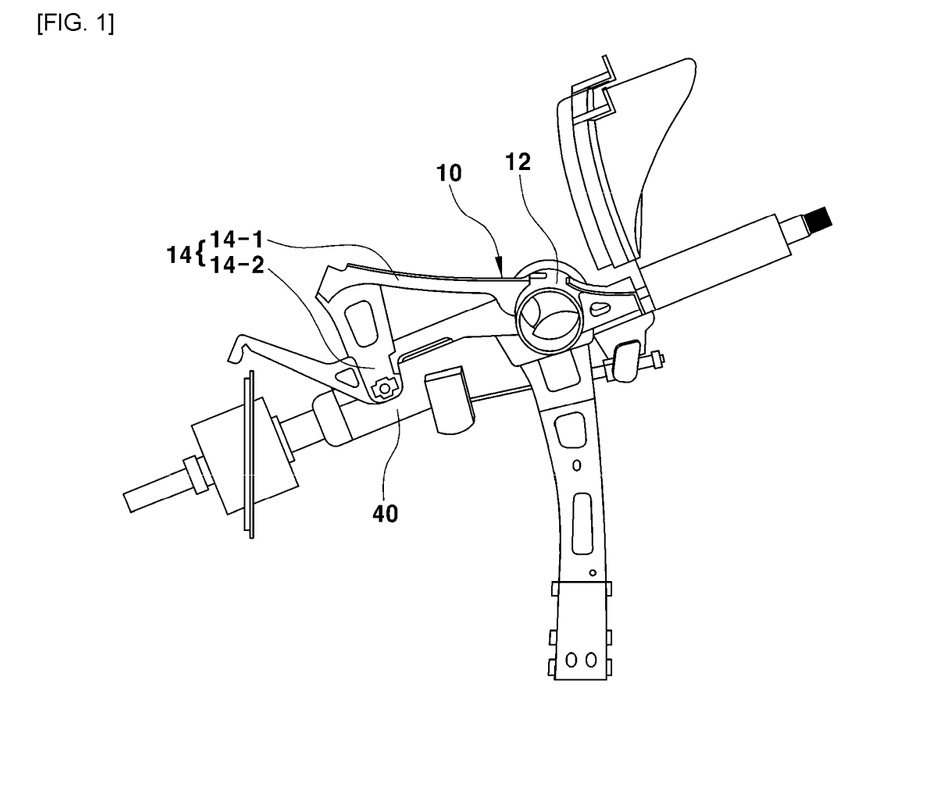
FIG. 1 is a side view illustrating a first conventional cowl cross bar and a mounting structure thereof.

A first conventional cowl cross bar and a mounting structure thereof, intended to fulfill the above functions, are illustrated in FIG. 1 of the accompanying drawings.

Referring to FIG. 1, the first conventional cowl cross bar 10 includes a main bar 12, which is disposed in a lateral direction of a vehicle body, and a mounting structure 14 extending forwards from the main bar 12.

The mounting structure 14 includes a linear connector 14-1, which linearly extends from the main bar 12 and is connected to a front vehicle body (not shown), and a steering-column support 14-2, which extends downwards from the front end of the linear connector 14-1 and is coupled to a steering column 40.

As mentioned above, since the linear connector 14-1 linearly extends forwards from the main bar 12 and is connected to the vehicle body (not shown) and since the steering-column support 14-2 for supporting the steering column 40 is integrally connected to the linear connector 14-1, it is possible to easily ensure not only self-supporting stiffness but also the stiffness required to additionally support the steering column 40.

Recently, because a head-up display (HUD), which displays various driving pieces of information to a driver on a windshield glass, is mounted in a space through which a cowl cross bar extends, a cowl cross bar having a structure different from that of the above-mentioned conventional cowl cross bar is applied.

Figure 2:
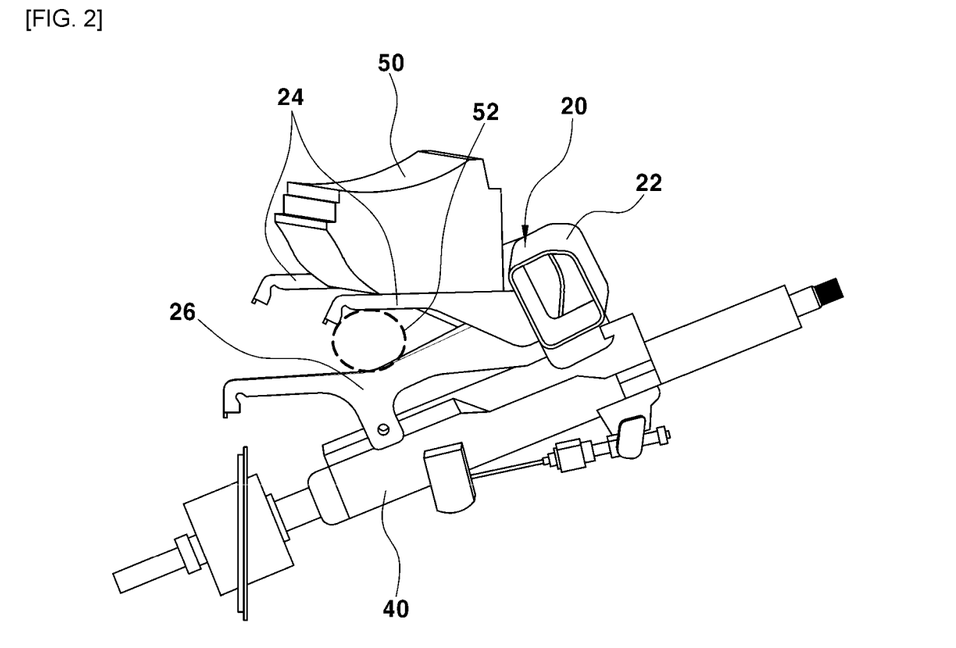
FIG. 2 is a perspective view illustrating a second conventional cowl cross bar and a mounting structure thereof.

FIG. 2 in the accompanying drawings illustrates a second conventional cowl cross bar and a mounting structure thereof.

The second conventional cowl cross bar is constructed so as to ensure sufficient space to mount an HUD and a passage through which an air duct extends.

Referring to FIG. 2, the second conventional cowl cross bar 20 includes a main bar 22, which is disposed in a lateral direction of a vehicle body, a pair of vehicle-body-connecting bars 24, which extend forwards from the main bar 22 and are connected to the vehicle body, and a column-connecting bar 26, which extends forwards from the main bar 22 and is coupled to a steering column 40.

Here, the space defined between the pair of vehicle-body-connecting bars 24 is formed as the space required to mount a head-up display (HUD) 50, and the space defined between the upper side of the column-connecting bar 26 and the lower side of the vehicle-body-connecting bar 24 is formed as the passage through which the air duct extends.

However, because the pair of vehicle-body-connecting bars 24 are cantilever structures and are thus incapable of enduring all vertical and lateral vibrations of the steering column 40, and because it has been found in the results of stiffness tests that the column-connecting bar 26 is additionally reinforced not at all in this case, there is a problem in that resistance to torque applied to the steering column 40 or rotational vibrations is very weak.

Figure 3:
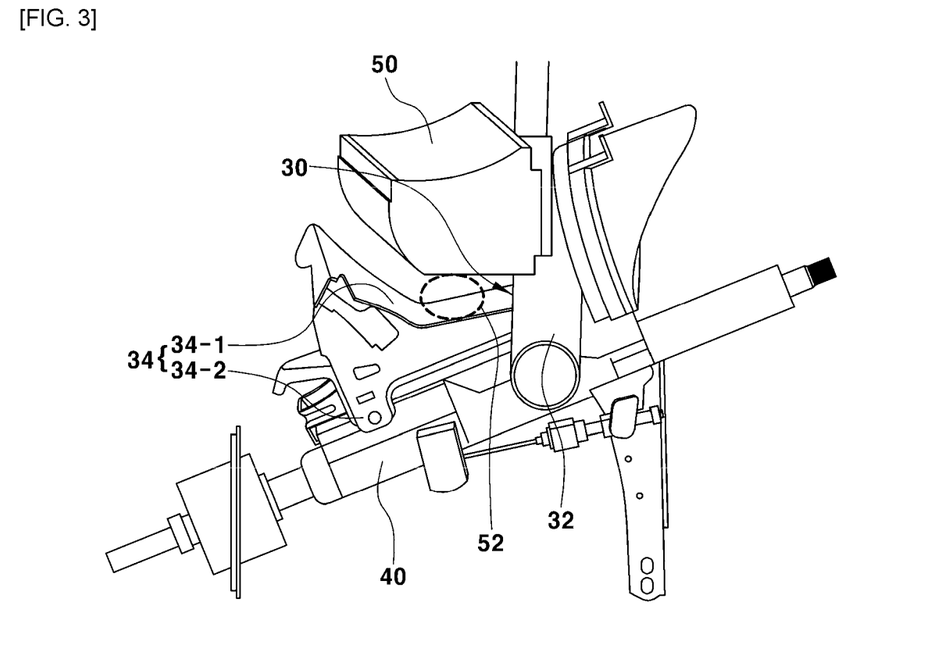
FIG. 3 is a perspective view illustrating a third conventional cowl cross bar and a mounting structure thereof.

FIG. 3 in the accompanying drawings illustrates a third conventional cowl cross bar and a mounting structure thereof.

The third conventional cowl cross bar is also constructed so as to ensure sufficient space to mount an HUD and a passage through which an air duct extends.

Referring to FIG. 3, the third conventional cowl cross bar 30 includes a main bar 32, which is disposed in a lateral direction of a vehicle body, and a mounting structure 34, which extends forwards from the main bar 32.

In particular, in order to ensure sufficient space to mount a head-up display 50 and a passage through which an air duct extends, the mounting structure 34 includes a bent frame 34-1, which is concave downwards, and a steering-column-coupling end 34-2, which extends downwards from the front end of the bent frame 34-1 and is coupled to a steering column 40.

However, because the bent frame 34-1 is configured to be concave downwards without additional reinforcement in order to ensure the space required to mount the head-up display 50 and the passage through which the air duct extends, it has been found in the results of stiffness tests that there is a problem in that stiffness is insufficient to support the main bar 32 or to support the steering column, and thus additional reinforcement is required.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present disclosure addresses the above-described problems associated with the prior art, and it is an object of the present disclosure to provide a cowl cross bar for a vehicle, which is adapted to be capable not only of easily ensuring a space in which an HUD device is disposed and a passage through which an air duct extends but also of exhibiting improved self-supporting stiffness and the stiffness required to additionally support a steering column.

In one aspect, the present disclosure provides a cowl cross bar for a vehicle including a main bar disposed in a lateral direction of a vehicle body, a pair of first brackets for supporting hardware, which is coupled to the main bar and extends forwards therefrom, a second bracket for supporting a steering column, which is coupled to the main bar and extends forwards therefrom, the second bracket being disposed between lower ends of the pair of first brackets for supporting hardware, and a third bracket for reinforcement, which is disposed between the pair of first brackets for supporting hardware and the second bracket for supporting the steering column and is connected thereto.

In a embodiment, the pair of first brackets for supporting hardware may be provided therein with air-duct-mounting holes so as to be laterally aligned with each other, the air-duct-mounting holes defining a passage through which an air duct extends.

In another embodiment, each of the pair of first brackets for supporting hardware may be provided at an upper end thereof with a first flange to which hardware is coupled.

In still another embodiment, each of the pair of first brackets for supporting hardware may be provided at a front end thereof with a second flange which is coupled to a vehicle body.

In yet another embodiment, each of the pair of first brackets for supporting hardware may be provided at a lower end thereof with a reinforcing bent portion, which is bent inwards and is welded to the second bracket to support the steering column.

In still yet another embodiment, the second bracket for supporting the steering column may be bent downwards at two opposite ends thereof so as to increase the intrinsic stiffness thereof.

In a further embodiment, the second bracket for supporting the steering column may be provided at a lower side of a middle portion thereof with a column-mounting portion, which is connected to the steering column and is supported by the third bracket for reinforcement.

In another further embodiment, the third bracket for reinforcement may include welding surfaces in order to connect the column-mounting portion of the second brackets for supporting the steering column and inner portions of the front ends of the pair of first brackets for supporting hardware to each other via the third bracket.

In still another embodiment, a lateral width of a rear end of the second bracket for supporting the steering column, which is welded to the main bar, may be larger than a lateral width of a front end of the second bracket, which is coupled to the steering column.

In yet another embodiment, the main bar may be extruded into a polygonal shape from an aluminum material.

In still yet another embodiment, the main bar may be extruded in conjunction with a reinforcing plate disposed therein so as to reinforce the stiffness of the main bar, upon extrusion molding.

Other aspects and embodiments of the disclosure are discussed herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example a vehicle powered by both gasoline and electricity.

The above and other features of the invention are discussed herein.

BRIEF DESCRIPTION OF THE DRAWINGS

The above and other features of the present disclosure will now be described in detail with reference to certain exemplary embodiments thereof, illustrated in the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of various embodiments. The specific features as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made to various embodiments, examples of which are illustrated in the accompanying drawings and described below.

While a number of exemplary aspects will be discussed below, those of skill in the art will recognize that still further modifications, permutations, additions and sub-combinations thereof of the disclosed features are still possible. It is therefore intended that the following appended claims and claims hereafter introduced are interpreted to include all such modifications, permutations, additions and sub-combinations as are within their true spirit and scope.

Figure 4:
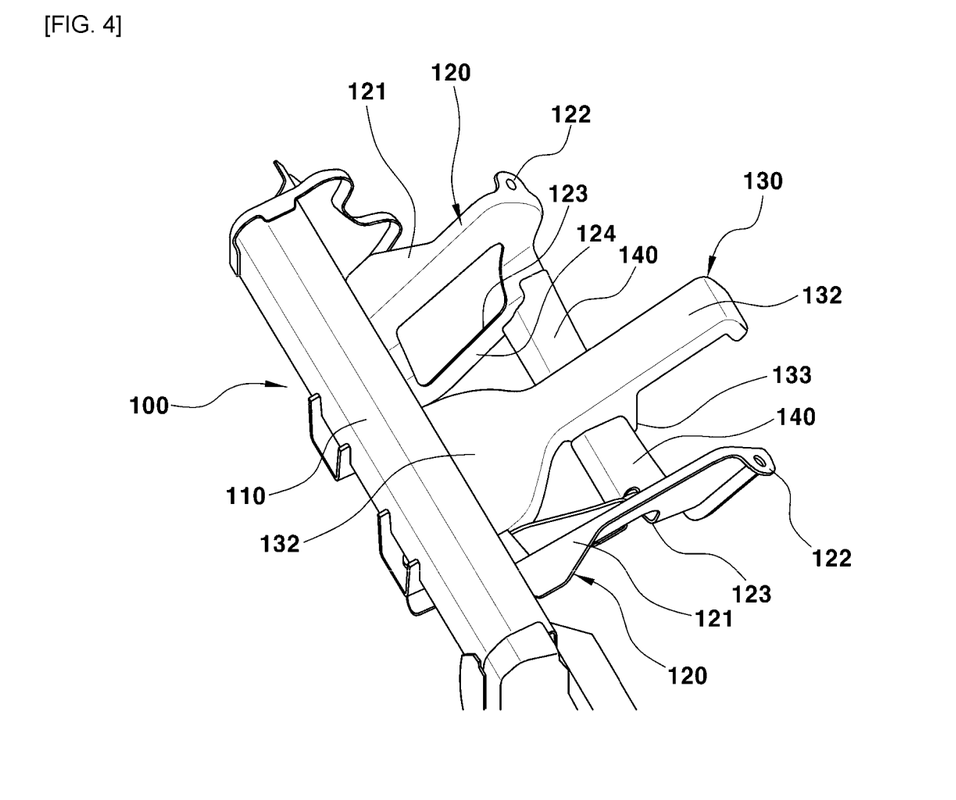
FIG. 4 is a perspective view illustrating a cowl cross bar according to the present invention.
Figure 5:
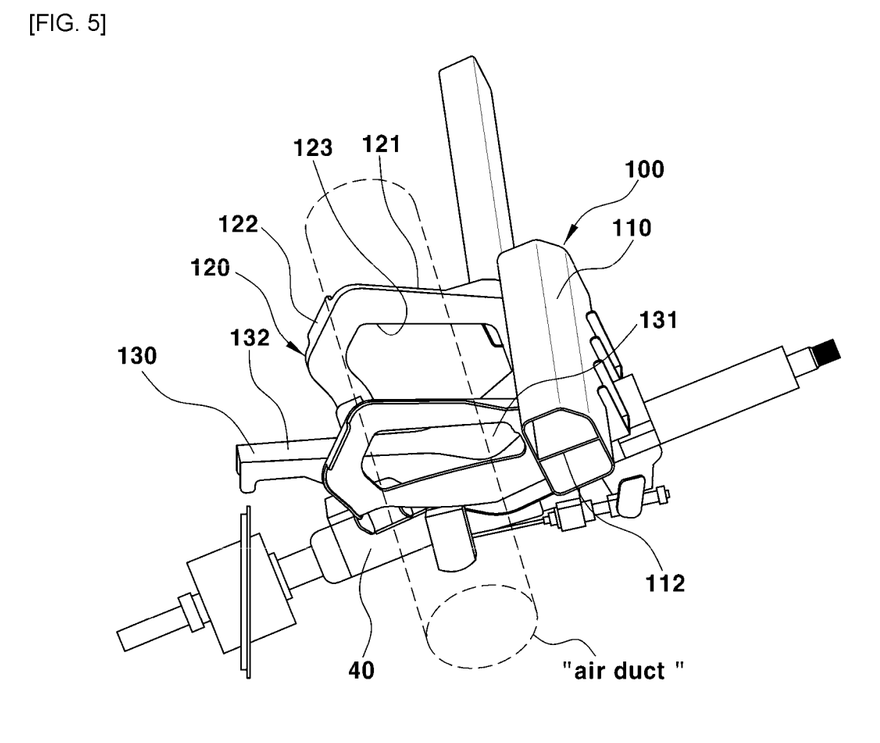
FIGS. 5 and 6 are perspective views illustrating the cowl cross bar and the mounting structure thereof according to the present invention.
Figure 6:
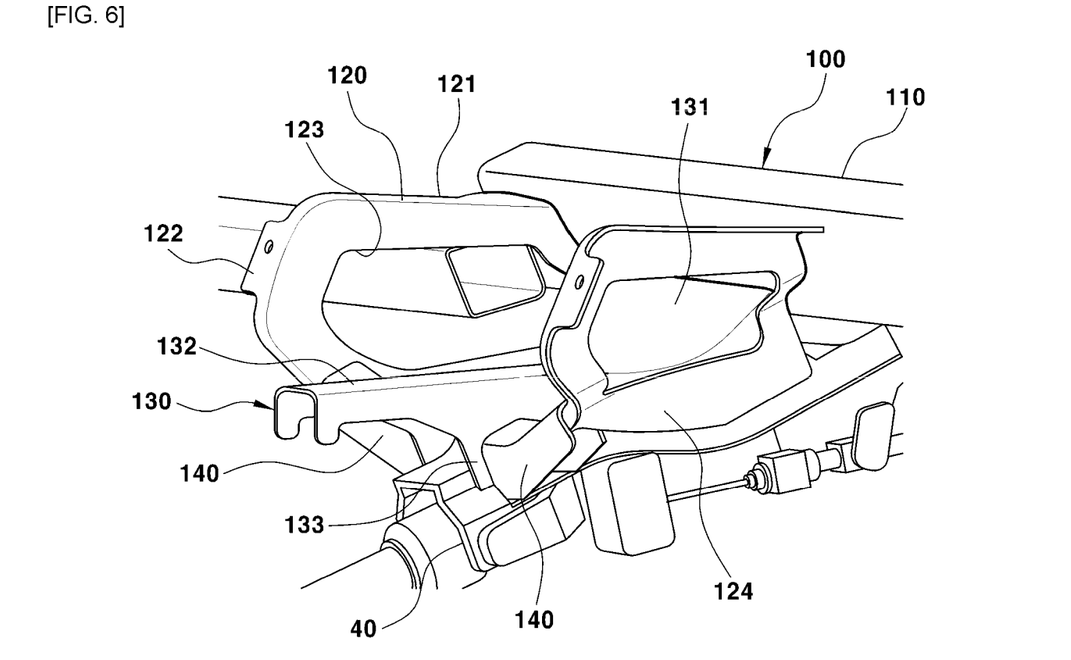
Figure 7:
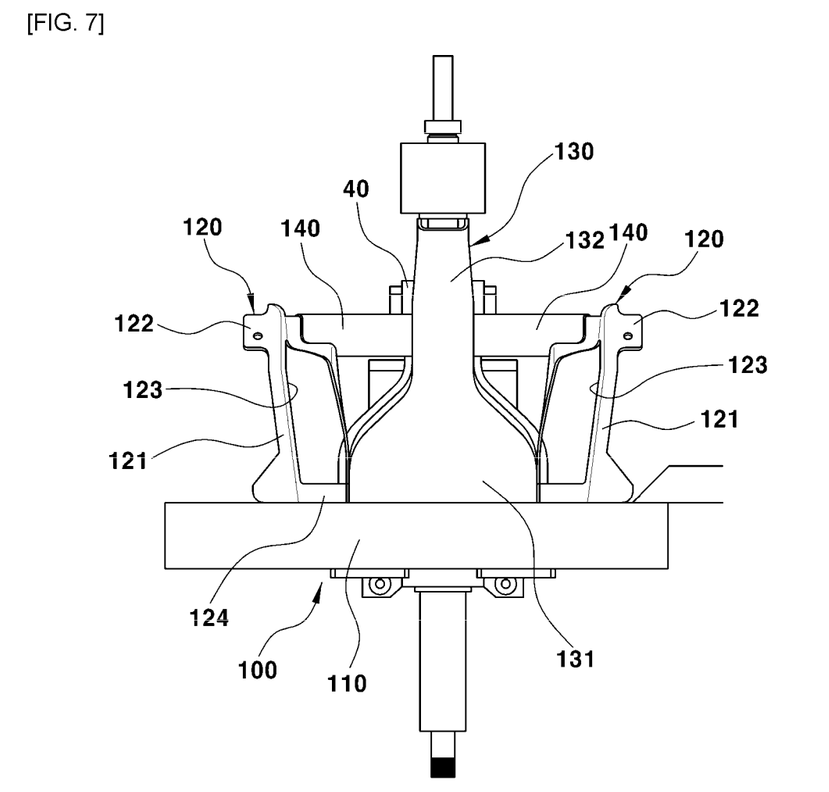
FIG. 7 is a plan view illustrating the cowl cross bar and the mounting structure thereof according to the present invention.

In the accompanying drawings, FIG. 4 is a perspective view illustrating a cowl cross bar according to the present invention. FIGS. 5 to 7 are views illustrating the cowl cross bar according to the present disclosure and a mounting structure thereof.

As illustrated in FIGS. 4 to 7, the cowl cross bar 100 according to the present disclosure includes a main bar 110, a pair of first brackets 120 for supporting hardware, which is integrally connected to the main bar 110, a second bracket 130 for supporting a steering column, which is integrally connected to the main bar 110 and is disposed between the pair of first brackets 120 for supporting hardware, and a third bracket 140 for reinforcement, which is connected both to the first brackets 120 and to the second bracket 130.

The main bar 110, which is secured at both ends thereof to a vehicle body panel (for example, a front pillar inner panel or the like) and which extends in a lateral direction of the vehicle body, constitutes the framework of the cowl cross bar 100.

The main bar 110 may be extruded into a polygonal shape including a square shape and a rectangular shape from an aluminum material in order to improve a matching property and binding force when the main bar 110 is connected to the first and second brackets 120 and 130.

Furthermore, the main bar 110 may be extruded in conjunction with a reinforcing plate 112 disposed therein, upon extrusion thereof.

As illustrated in FIG. 5, the main bar 110 may be extruded into a structure, which is chamfered at one edge thereof so as to have a pentagonal cross-section, and may be extruded in conjunction with the reinforcing plate 112 disposed therein.

The pair of first brackets 120 for supporting hardware is configured so that each first bracket has the same shape and structure. The pair of first brackets 120 are integrally formed with the main bar 110 and extend forwards in the state of being spaced apart from each other by a predetermined distance.

Air-duct-mounting holes 123, which define a passage through which an air duct extends, are formed in the first brackets 120 for supporting hardware so as to be laterally aligned with each other. Accordingly, the air duct may be easily mounted through the air-duct-mounting holes 123.

Each of the first brackets 120 for supporting hardware may be provided at the upper end thereof with a first flange 121 for assembling hardware, which is bent at the upper end of the first bracket 120 and extends outwards so as to define a horizontal plane. Accordingly, a hardware component such as an HUD may be easily mounted and secured to the first flange 121.

As mentioned above, since the pair of first brackets 120 for supporting hardware, which are integrally formed with the main bar 110 and extend forwards, are respectively provided with the air-duct-mounting holes 123, it is possible to easily provide air-duct-receiving spaces and it is possible to easily mount a hardware component such as an HUD on the first flanges 121 of the first brackets 120 for supporting hardware.

Furthermore, each of the first brackets 120 for supporting hardware is provided at the front end thereof with a second flange 122, which is bent outwards so as to allow the first bracket 120 to be coupled to a front vehicle body (for example, a cowl panel or the like). The second flange 122 may be easily welded to the front vehicle body.

Furthermore, each of the first brackets 120 for supporting hardware is provided at the lower end thereof with a reinforcing bent portion 124, which is bent inwards. The reinforcing bent portion 124 is welded to the lateral surface portion of the second bracket 130 for supporting the steering column, thereby improving the support stiffness of the first brackets 120 for supporting hardware.

In this way, since the cowl cross bar is fixed at three points such that the rear ends of the first brackets 120 for supporting hardware are welded to the main body 110, the front ends of the first brackets 120 for supporting hardware are welded to the front vehicle body, and the reinforcing bent portions, which are formed at the lower ends of the first brackets 120, are welded to the second bracket 130 for supporting the steering column, it is possible to achieve an improvement in the intrinsic stiffness of the first brackets 130 for supporting hardware and sufficient reinforcement for stiffness capable of enduring vertical and lateral vibration of the steering column.

The second bracket 130 for supporting the steering column is integrally formed with the main bar 110 and extends forwards. The second bracket 130 is disposed between the lower ends of the pair of first brackets 120 for supporting hardware so as not to obstruct the air-duct-mounting holes 123.

Here, the second bracket 130 for supporting the steering column is configured to have an inverted "U"-shaped cross-section in order to increase the intrinsic stiffness.

In particular, the second bracket 130 for supporting the steering column has an inverted "U"-shaped cross-section. The lateral width of the rear end of the second bracket 130 for supporting the steering column, which is welded to the main bar 110, is larger than the lateral width of the front end 132 of the second bracket 130 for supporting the steering column.

A column-mounting portion 133, which is coupled to the steering column 40, is integrally formed with the bottom of the central portion of the second bracket 130 for supporting the steering column and extends therefrom.

Consequently, since the rear end 131 of the second bracket 130 for supporting the steering column is welded to the main bar 110 and the steering column 40 is mounted on the column-mounting portion 133, the stiffness required to support the steering column 40 may be easily ensured by means of the second bracket 130 for supporting the steering column.

More specifically, since the second bracket 130 for supporting the steering column is configured to have an inverted "U"-shaped cross-section so as to increase its intrinsic stiffness and the lateral width of the rear end 131 of the second bracket 130 for supporting the steering column is larger than the lateral width of the front end 132 thereof so as to increase the area in which the second bracket 130 is welded to the main bar 110, it is possible to realize self-supporting stiffness and additionally realize sufficient stiffness to support the steering column 40.

The third bracket 140 for reinforcement is further connected to the first brackets 120 for supporting hardware and the second bracket 130 for supporting the steering column.

To this end, the third bracket 140 for reinforcement is configured to have welding surfaces on the two opposite ends thereof so as to be welded to the column-mounting portion of the second bracket 130 and to the inner portions of the front ends of the first brackets 120.

More specifically, since the third bracket 140 for reinforcement is configured to have an inverted "U"-shaped cross-section so as to increase its intrinsic stiffness and is welded to the outer surface of the column-mounting portion 133 of the second bracket 130 for supporting the steering column and the inner portions of the front ends of the first brackets 120 for supporting hardware, it is possible for the second bracket 130 for supporting the steering column and the first brackets 120 for supporting hardware to endure vertical and lateral vibration of the steering column and it is possible to further improve the intrinsic stiffness of the cowl cross bar and the stiffness required to support the steering column.

By virtue of the above-described construction, the present embodiment provides the following effects.

First, since the pair of first brackets for supporting hardware, which have the air-duct-mounting holes therein, are integrally formed with the main bar and extend therefrom, it is possible to easily ensure a passage through which an air duct extends.

Second, since the cowl cross bar is fixed at three points such that the rear ends of the first brackets for supporting hardware are welded to the main body, the front ends of the first brackets for supporting hardware are welded to the front vehicle body, and the reinforcing bent portions, which are formed at the lower ends of the first brackets, are welded to the second bracket for supporting the steering column, it is possible to reinforce the stiffness so as to be capable of withstanding vertical and lateral vibration of the steering column.

Third, since the first brackets for supporting hardware are respectively provided on the upper ends thereof with the first flanges, which are bent outwards, it is possible to easily mount a hardware component such as an HUD.

Fourth, since the second bracket for supporting the steering column is configured to have an inverted "U"-shaped cross-section, it is possible to increase its intrinsic stiffness. Furthermore, since the lateral width of the rear end of the second bracket for supporting the steering column, which is welded to the main bar, is larger than the lateral width of the front end thereof so as to increase the area in which the second bracket is welded to the main bar, it is possible to greatly increase the stiffness required to support the steering column.

Fifth, since the first brackets for supporting hardware and the second brackets for supporting the steering column are connected to each other by means of the third bracket for reinforcement, which has an inverted "U"-shaped cross-section, it is possible to further improve the intrinsic stiffness of the cowl cross bar and the stiffness required to support the steering column.

It will be appreciated by those skilled in the art that changes may be made in these embodiments without departing from the principles and spirit of the invention, the scope of which is defined in the appended claims and their equivalents.

The invention claimed is:

1. A cowl cross bar for a vehicle comprising:
a main bar disposed in a lateral direction from a vehicle body;
a pair of first brackets for supporting hardware, each first bracket being coupled to the main bar and extending forwards therefrom;
a second bracket for supporting a steering column, which is coupled to the main bar and extends forwards therefrom, the second bracket being disposed between lower ends of the pair of first brackets for supporting hardware; and
a third bracket for reinforcement, which is disposed between the pair of first brackets for supporting hardware and the second bracket for supporting the steering column and is connected thereto.

2. The cowl cross bar of claim 1, wherein each of the pair of first brackets for supporting hardware is provided therein with air-duct-mounting holes so as to be laterally aligned with each other, the air-duct-mounting holes defining a passage through which an air duct extends.

3. The cowl cross bar of claim 1, wherein each of the pair of first brackets for supporting hardware is provided at an upper end thereof with a first flange to which a hardware component is coupled.

4. The cowl cross bar of claim 1, wherein each of the pair of first brackets for supporting hardware is provided at a front end thereof with a second flange which is coupled to a vehicle body.

5. The cowl cross bar of claim 1, wherein each of the pair of first brackets for supporting hardware is provided at a lower end thereof with a reinforcing bent portion, which is bent inwards and is welded to the second bracket for supporting the steering column.

6. The cowl cross bar of claim 1, wherein the second bracket for supporting the steering column is bent downwards at two opposite ends thereof so as to increase a self-supporting stiffness.

7. The cowl cross bar of claim 1, wherein the second bracket for supporting the steering column is provided at a lower side of a middle portion thereof with a column-mounting portion, which is connected to the steering column and is supported by the third bracket.

8. The cowl cross bar of claim 7, wherein the third bracket includes welding surfaces to connect the column-mounting portion of the second brackets for supporting the steering column and inner portions of the front ends of the pair of first brackets to each other via the third bracket.

9. The cowl cross bar of claim 1, wherein a lateral width of a rear end of the second bracket, which is welded to the main bar, is larger than a lateral width of a front end of the second bracket, which is coupled to the steering column.

10. The cowl cross bar of claim 1, wherein the main bar is extruded into a polygonal shape from an aluminum material.

11. The cowl cross bar of claim 10, wherein the main bar is extruded in conjunction with a reinforcing plate disposed therein so as to reinforce a stiffness of the main bar upon extrusion molding.

* * * * *